C. S. DENTON.
MACHINE FOR HARVESTING GRAIN.
APPLICATION FILED FEB. 13, 1917.
1,249,914.
Patented Dec. 11, 1917.
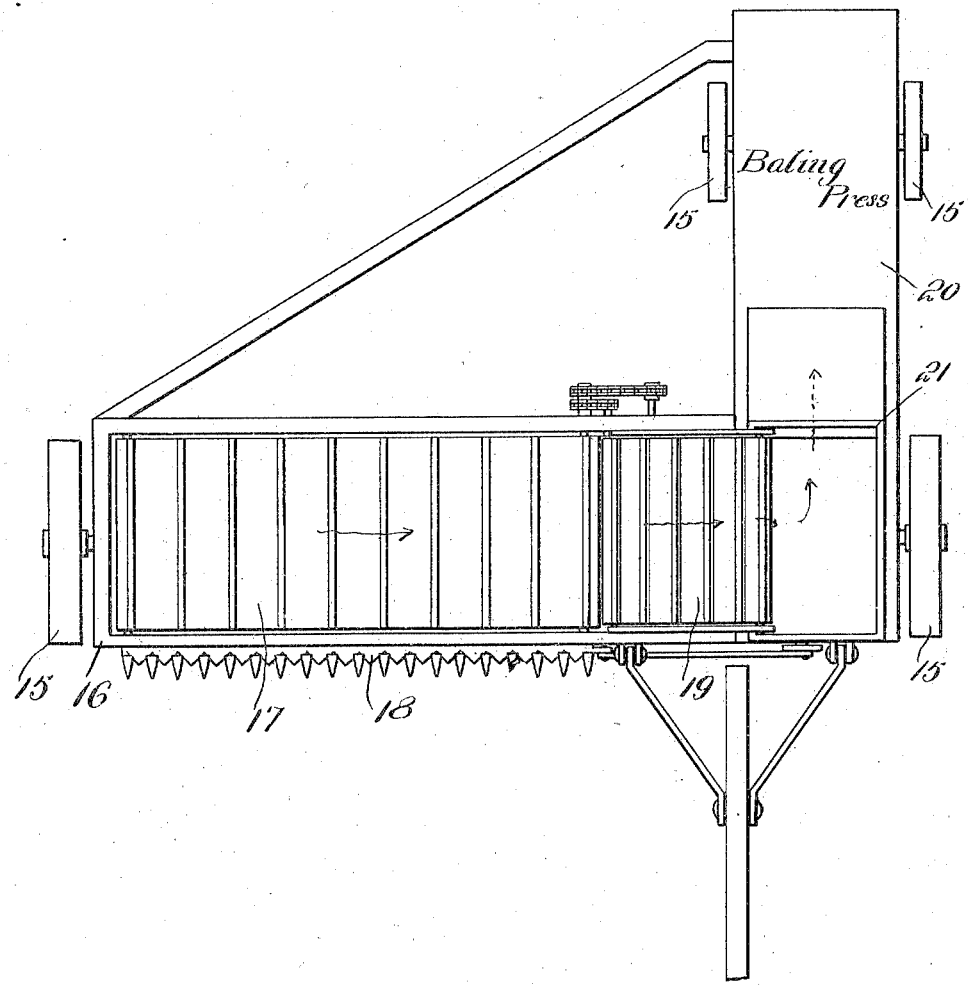
WITNESSES
INVENTOR
Cromwell S. Denton
BY Victor J. Evans
ATTORNEY

UNITED STATES PATENT OFFICE.

CROMWELL SAYRE DENTON, OF LEXINGTON, KENTUCKY.

MACHINE FOR HARVESTING GRAIN.

1,249,914.  Specification of Letters Patent.  Patented Dec. 11, 1917.

Application filed February 13, 1917. Serial No. 148,396.

*To all whom it may concern:*

Be it known that I, CROMWELL S. DENTON, a citizen of the United States, residing at Lexington, in the county of Fayette and State of Kentucky, have invented new and useful Improvements in Machines for Harvesting Grain, of which the following is a specification.

This invention relates to a machine for harvesting grain and it has for its object to provide a simple and improved machine whereby small grain of various kinds such as wheat, oats, rye and the like may be quickly, safely and inexpensively harvested without the danger of loss from various causes which is liable to occur when any of the methods of procedure now generally resorted to are carried into operation.

The methods of harvesting grain most commonly resorted to at the present time involve the use of the binder or of the so-called header, the latter machine being sometimes combined with a threshing machine or separator whereby the heads are threshed in the field immediately after being detached from the stalks.

The use of the binder involves the subsequent arrangement of the sheaves in shocks which require to be subsequently gathered and stacked, the interval between shocking and stacking causing a serious danger of injury to the grain by rain. This method also involves the necessity of handling the sheaves several times thereby involving considerable expense and loss of time which during the harvesting season might be very profitably employed in other ways.

The heading of grain which is mostly resorted to in grain growing areas of large dimensions is objectionable in several ways. If the grain is permitted to ripen thoroughly the loss by grain dropping from the heads is very large, this being especially pronounced when the header is combined with a threshing machine because it is then necessary that the grain should be thoroughly ripe in order that it may be effectively threshed and separated. If, on the other hand, the grain is not permitted to ripen thoroughly on the stalk there is great danger of the grain heating and being injuriously affected thereby while stacked prior to threshing. By my improved machine I endeavor to eliminate these objections.

In carrying my invention into practical operation I propose to avail myself of a machine which has been diagrammatically shown in the accompanying drawings in which the single view shows a diagram of the machine. The said machine which is mounted on wheels 15 for convenience and transportation includes a platform 16 over which a movable apron 17 is guided, a cutting apparatus 18 at the forward end of the platform, an elevator or conveyer 19, and a baling press 20 having a hopper 21 into which material is fed by the elevator.

It is intended to mount the platform and the cutting apparatus at such a height from the ground that the stalks of the grain will be severed near the heads, leaving the greater portion of the stalks standing in the field, but leaving also a portion of a stalk attached to each head. As the grain is being cut, the heads with portions of the stalks adhering thereto will drop on the platform and will be carried by the movable apron to the elevator and by the elevator to the hopper of the baling press into which the material is discharged. When a sufficient quantity to form a bale has been introduced into the press box, the press mechanism is thrown into operation and a bale is pressed, tied and ejected from the press box.

By my improved machine the grain is cut instead of being stripped from the stalks and the grain may therefore be permitted to ripen thoroughly before harvesting the same, especially in view of the fact that it is not handled subsequently to cutting in a manner liable to cause loss by grain dropping from the heads. The heads with the short portions of stalks adhering thereto may readily be formed into a bale of compact form, such bales being in convenient form for subsequent gathering and conveying to a central point where the bales may be stored until a convenient time for threshing.

Having thus described the invention, what is claimed as new is:

1. A grain harvesting machine including an apparatus for cutting the heads of grain with as little stalk as practicable adhering thereto, a baling press, and means for transferring the heads of grain from the cutting apparatus to the baling press.

2. An organized machine for harvesting grain, said machine including an apparatus for cutting the heads of grain with as little of the stalk as practicable adhering thereto, a platform, an endless apron guided over the platform, an elevator, and a baling press having a hopper into which the cut material is discharged from the elevator.

In testimony whereof I affix my signature.

CROMWELL SAYRE DENTON.